United States Patent [19]

Fujimoto et al.

[11] 4,150,258
[45] Apr. 17, 1979

[54] ELECTRONIC SWITCHING SYSTEM

[75] Inventors: Shigefumi Fujimoto, Tokyo; Yasunobu Suzuki, Koganei; Hiromasa Ikeda, Tokyo; Nobuyoshi Akiyama, Hoya, all of Japan

[73] Assignees: Oki Electric Industry Co., Ltd.; Nippon Telegraph & Telephone Public Corp., both of Tokyo, Japan

[21] Appl. No.: 878,594

[22] Filed: Feb. 16, 1978

Related U.S. Application Data

[63] Continuation of Ser. No. 651,564, Jan. 22, 1976, abandoned.

[30] Foreign Application Priority Data

Feb. 3, 1975 [JP] Japan .................................. 50-013366
Feb. 19, 1975 [JP] Japan .................................. 50-019866

[51] Int. Cl.² .............................................. H04Q 5/18
[52] U.S. Cl. ............................. 179/18 FC; 179/15 A; 179/18 FG
[58] Field of Search ......... 179/18 FC, 18 FF, 18 FG, 179/18 F, 18 GF, 15 AT, 15 A

[56] References Cited

U.S. PATENT DOCUMENTS

| | | | |
|---|---|---|---|
| 1,488,690 | 4/1924 | Lundquist | 179/18 F |
| 1,540,419 | 6/1925 | Powell | 179/18 F |
| 2,892,037 | 6/1959 | Feiner | 179/18 FC |
| 3,458,659 | 7/1969 | Sternung | 179/15 AQ |
| 3,601,547 | 8/1971 | Potter | 179/18 GF |
| 3,725,863 | 4/1973 | Freimanis | 179/18 GF |
| 3,778,555 | 12/1973 | Nordling | 179/18 FC |
| 3,821,484 | 6/1974 | Sternung | 179/18 FG |
| 3,863,033 | 1/1975 | Chen | 179/18 FC |

*Primary Examiner*—David L. Stewart
*Attorney, Agent, or Firm*—Kenyon & Kenyon

[57] ABSTRACT

In a telephone exchange system comprising a time division exchange system and space division concentrators connected to said exchange system with a PCM lines, said concentrators are controlled by said exchange system, thus those volume of hardware in the concentrators can be considerably reduced. Said concentrator comprises a space division switching network having self-latched electronic contacts, which are controlled by a periodical drive pulse from a cyclic readout type memory.

8 Claims, 21 Drawing Figures

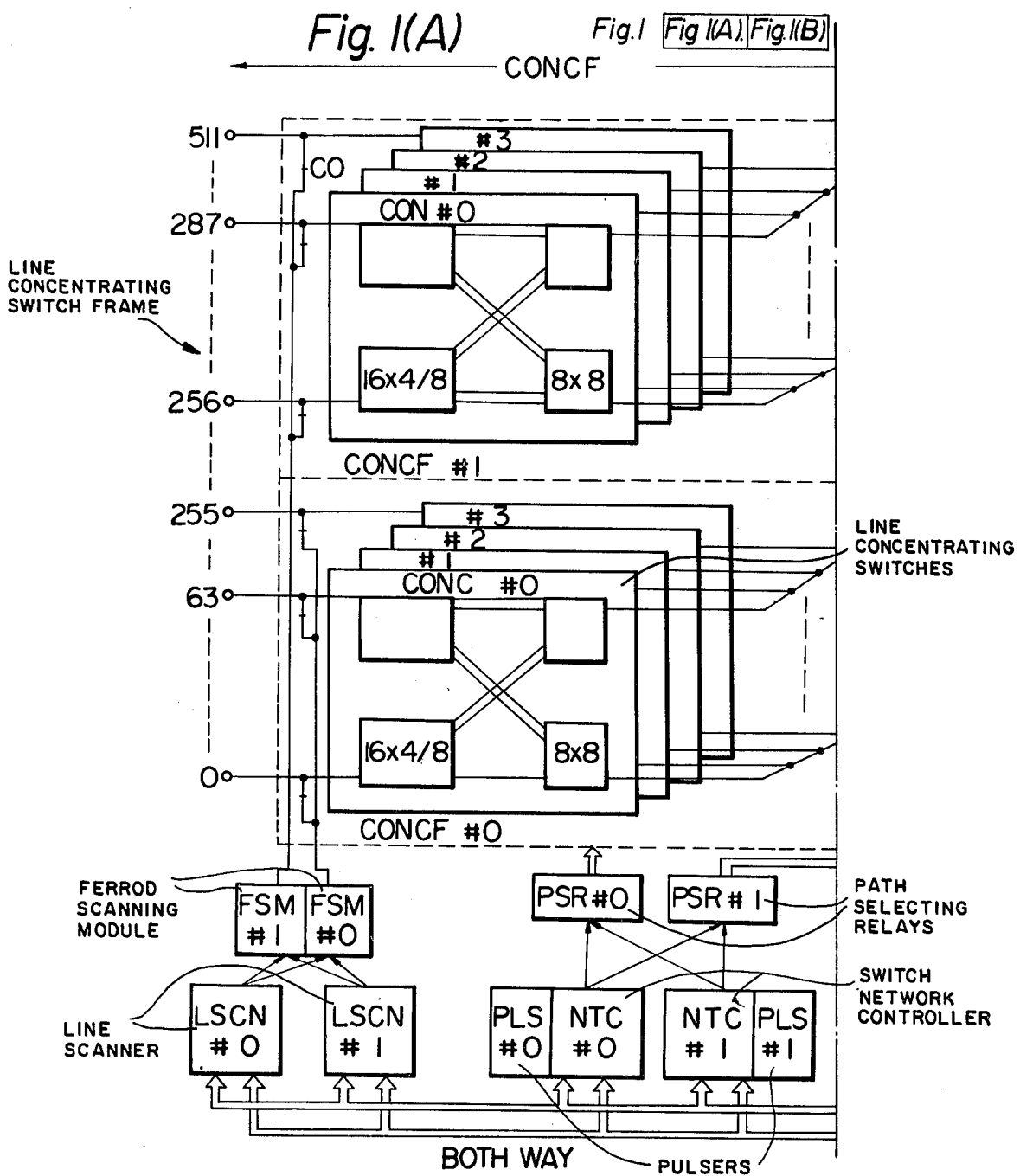

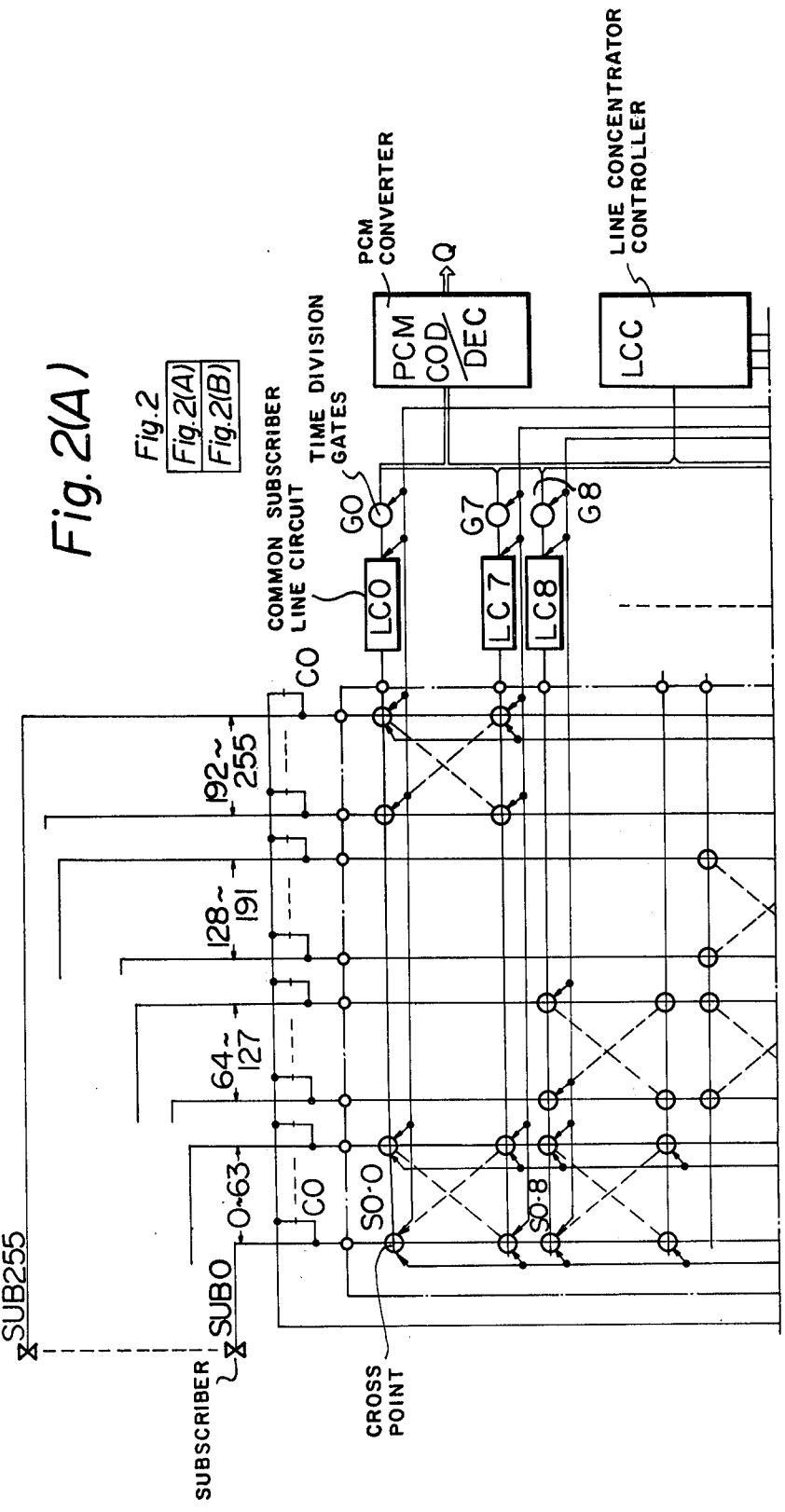

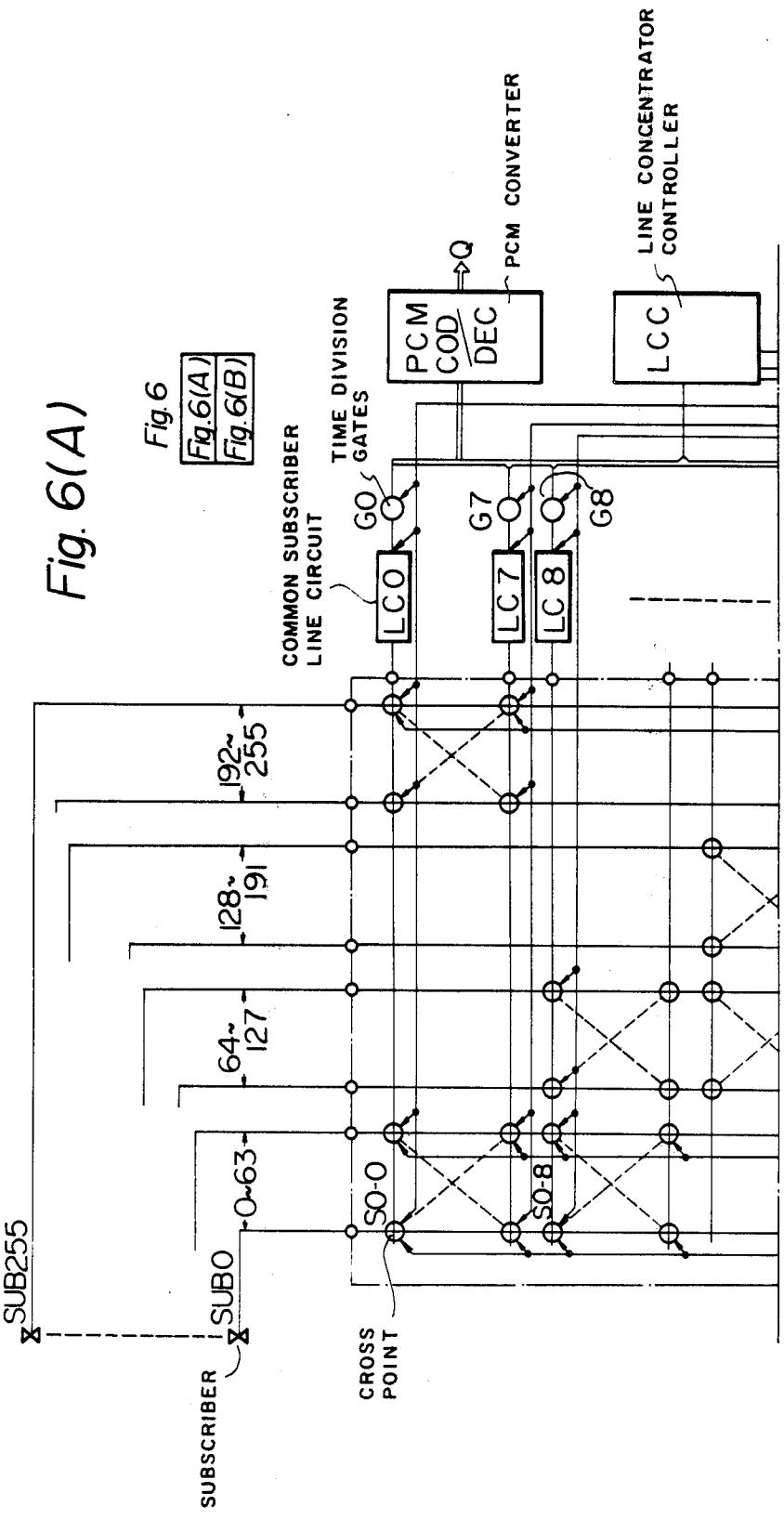

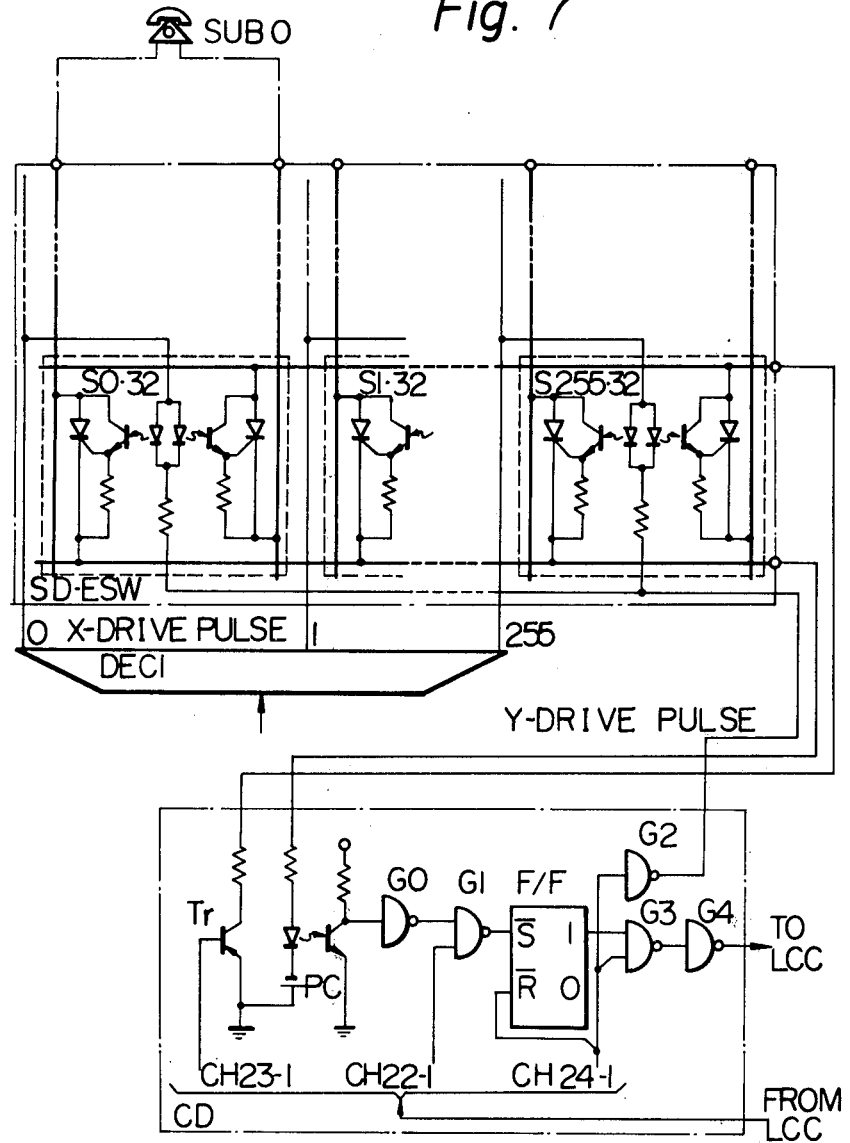

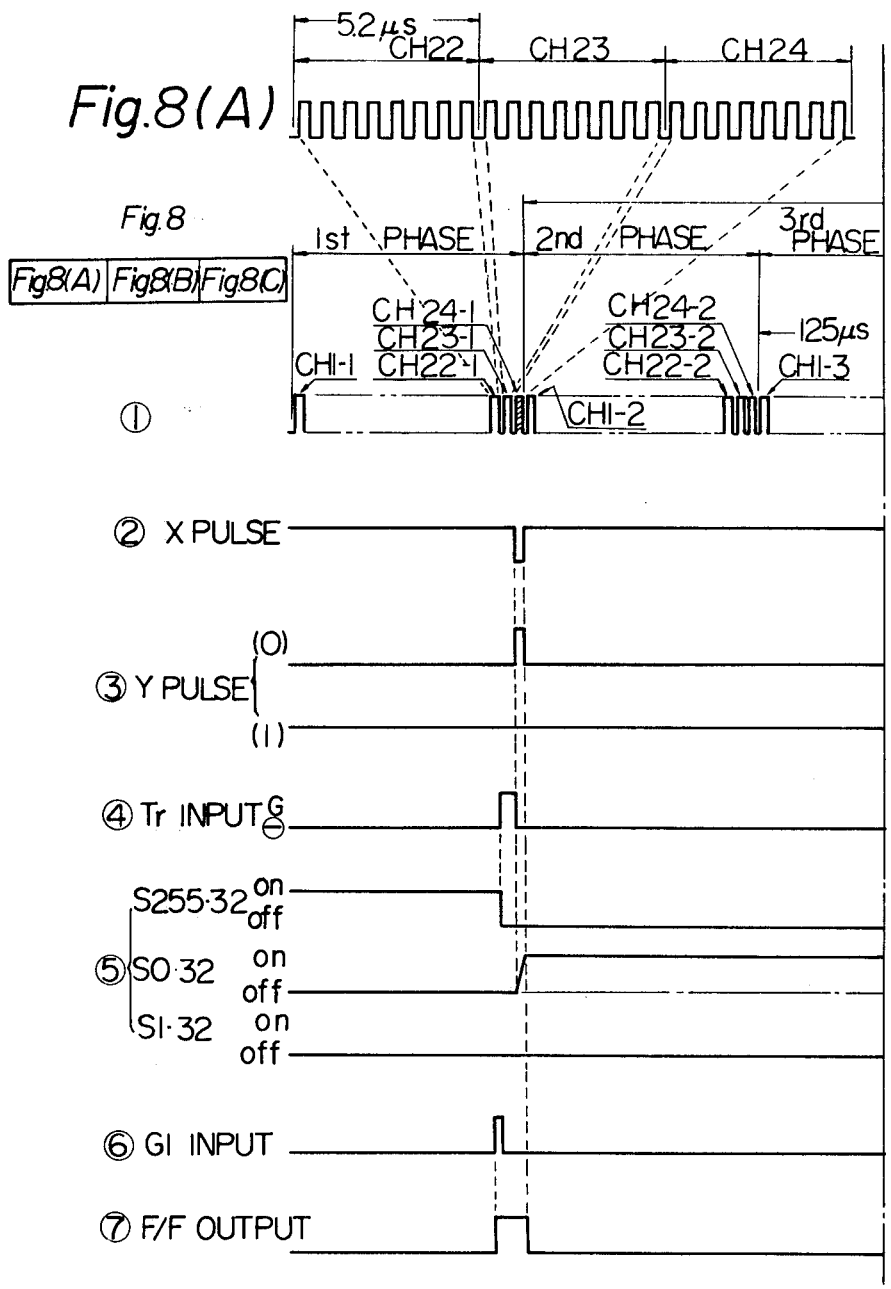

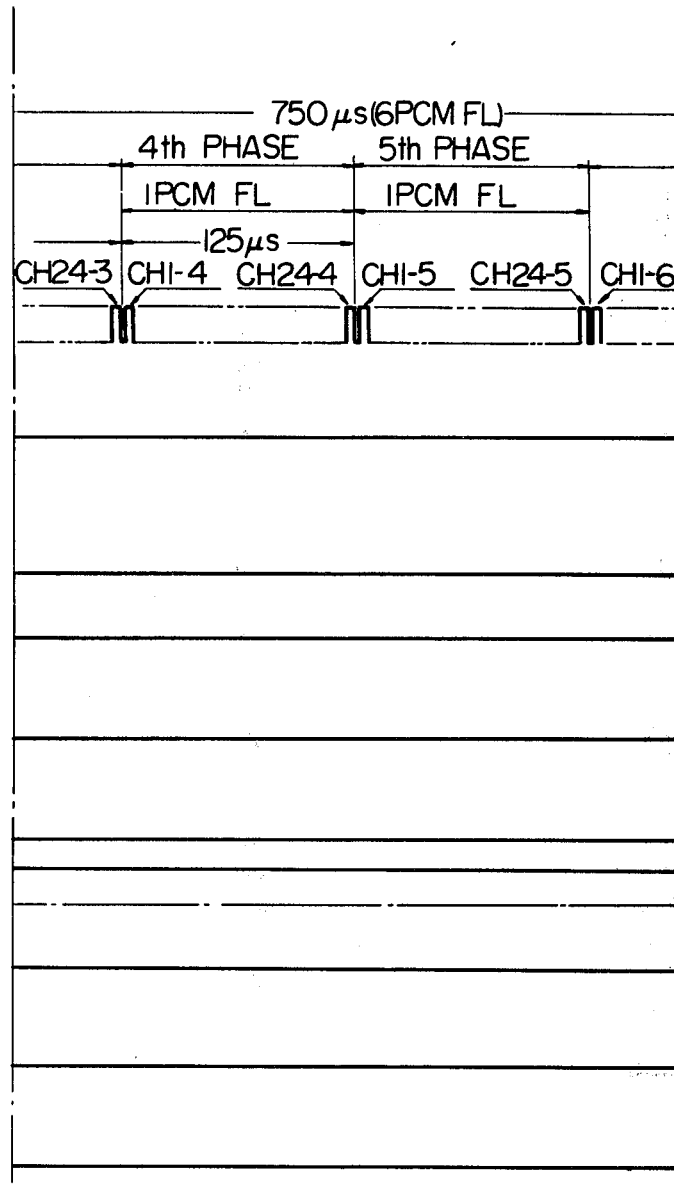

ELECTRONIC SWITCHING SYSTEM

This is a continuation, of application Ser. No. 651,564 filed Jan. 22, 1976, now abandoned.

BACKGROUND OF THE INVENTION

This invention relates to an improvement of line concentrating stage of a time-division local switching system.

According to a recent trend in telephone switching system electronic switching system is gradually replacing cross bar switching system, for the purpose of space saving and improving the economy and flexibility thereof. It appears that use of time-division switching systems in the speech-path equipment will expand in the future, to further reduce the size and improve the overall network economy. In fact, commercial use of time-division toll switching system has been announced in some countries. However, as far as the local switching system is concerned, the simple use of time-division switching techniques does not fulfill the desired space saving and reduction of cost for the following reasons.

(A) Although use of the time-division multiplex techniques facilitates extreme miniaturization and economization of speech-path switches, it requires a converter per subscriber line (in subscriber line circuits and trunk circuits) for converting voice signals into a time-division multiplexed signal. Such converters cost more than half the entire cost of a time-division speech-path system, so that economization of the converters is an important problem.

(B) The line occupancy of the trunk line is usually high, being 0.5 to 0.7 erlang/line, so that its cost per erlang is low. On the other hand, the subscriber line is used only at a low utilizing rate, e.g., 0.1 erlang/line, so that the cost per erlang is high. Accordingly, it is very difficult to construct an economical local switching system using time-division techniques alone.

(C) As a means for reducing the number of the converters (subscriber line circuit) line concentrator has been proposed, in which space-division switches are provided in the subscriber lines so as to effect the time-division multiplex on a commonly-used subscriber line circuit after traffic concentration (for instance, see KENKYU JITSUYOKA HOKOKU, or Research and Development Report, Vol. 16, No. 11, P. 423, "Speech-path configuration of Switching Equipment DEX-T1"). Such a conventional metallic line concentrator, however, does not reduce the overall cost because it requires a considerable amount of hardware, e.g., subscriber line scanners, metallic crosspoint drivers, signal-transmitting trunks, and so on.

SUMMARY OF THE INVENTION

It is an object, therefore, of the present invention to overcome the disadvantages and limitations of a prior art by providing a new and improved telephone exchange system.

The present invention is based on the fact that the time-division subscriber line switching equipment cannot be miniaturized and economized by a mere combination of conventional techniques. The present invention provides electronic crosspoint concentration and TDM switching technique and a novel subscriber line scanning system, by drastically improving a conventional subscriber line scanning system in the line concentrator, as referred to in the above item (C), so as to reduce the volume of mountable hardware that of conventional system and cut down the cost to a great extent.

BRIEF DESCRIPTION OF THE DRAWINGS

The foregoing and other objects, features, and attendant advantages of the invention will be appreciated as the same become better understood by the accompanying drawings wherein:

FIGS. 1(A) and 1(B) show a block diagram, illustrating conventional metallic line concentrating switch equipment;

FIGS. 2(A) and 2(B) illustrate a block diagram of an embodiment of the present invention, employing electronic line concentrator;

FIGS. 6(A) and 6(B) show a block diagram of an embodiment of the present invention, employing subscriber line scanner;

FIG. 7 is a circuit diagram of an essential portion of said embodiment;

FIGS. 8(A), 8(B) and 8(C) show a timing chart, illustrating the operation of said embodiment;

DESCRIPTION OF THE PREFERRED EMBODIMENTS

Figure 1B:
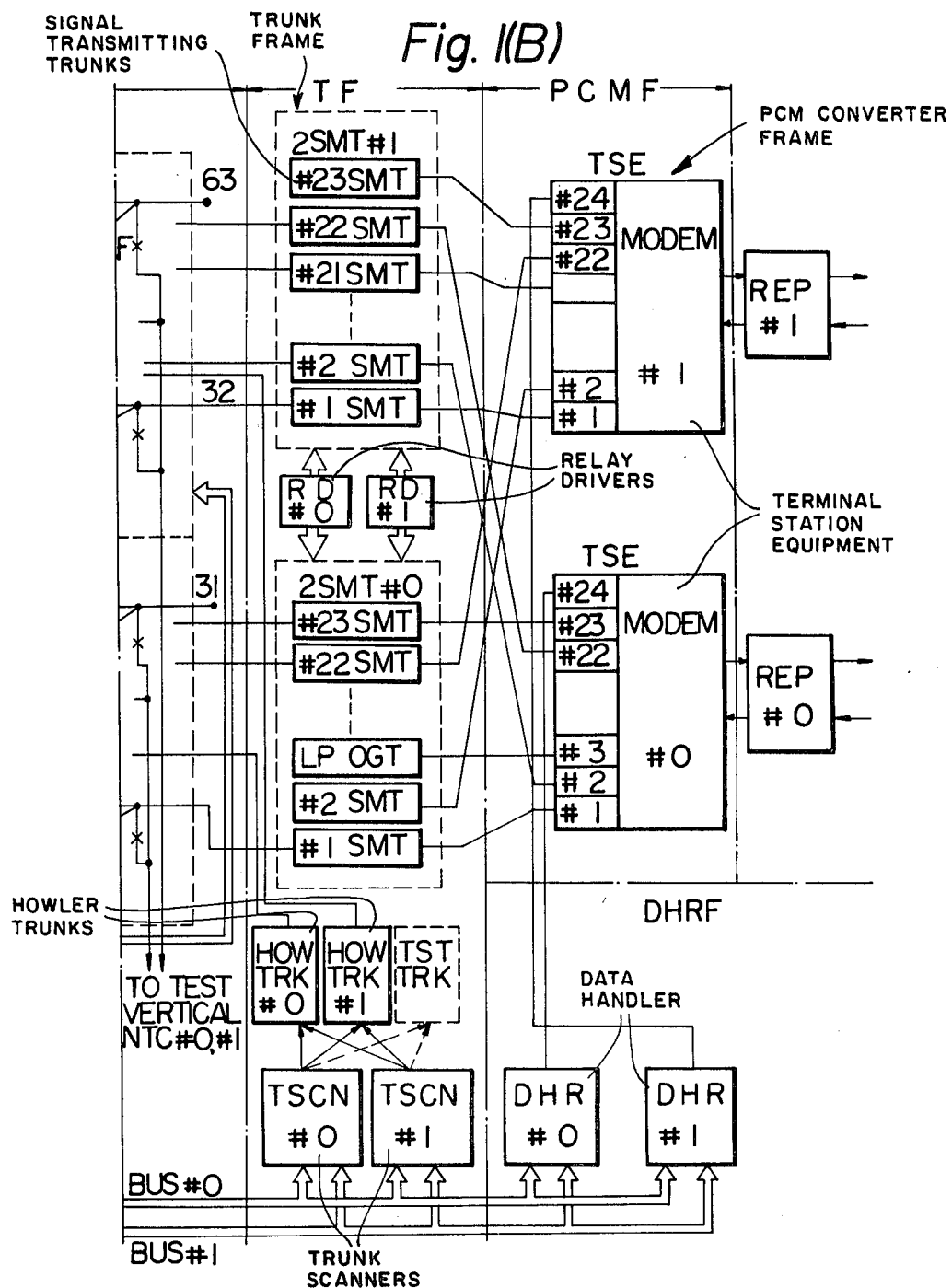

First, the prior line concentrator will be explained to facilitate easy understanding of the present invention with reference to FIGS. 1(A) and 1(B).

In the figure, CONCF is a line-concentrating switch frame consisting of a plurality of line-concentrating switches CONC using space-division mechanical contacts of a two-stage connection type, which line-concentrating switch frame concentrates 512 subscriber lines into 64 terminals, or at a concentrating factor of 8:1. FSM is a "FERROD" scanning module, and LSCN is a line scanner. The line-concentrating switches CONC are driven by path-selecting relays PSR and pulsers PLS and a switch network controller NTC. The entire line-concentrating switch frame CONCF includes two structural frames. TF is a trunk frame, which is a single frame having 46 signal transmitting trunks SMT, two howler trunks HOWTRK, trunk scanners TSCN detecting the state of the trunks, and relay drivers RD driving relays in each trunk. PCMF is a PCM (pulse-code-modulation) converter frame, which is a single frame consisting of two sets of terminal station equipment TSE of a widely-used commercial PCM-24 system. DHR is a data handler, two of which constitute a single dual type frame for carrying out remote line concentration from a remote station by using one channel 64 Kb/S of a PCM-24 system. Thus, with the conventional line concentrator of FIGS. 1(A)

and 1(B), in order to concentrate the 512 subscriber lines into a system of two terminal station equipment TSE of PCM-24 channels, a four-frame construction excepting a data handler DHR frame is required in the case of an intra-office line concentrator, while a five-frame construction including the data handler DHR frame is required in the case of a remote line concentrator. Accordingly, a considerably large amount of hardware is required, resulting in a high cost.

The reasons such a large amount of hardware is required are as follows.

(I) The use of the space-division mechanical contact switch network results in an increase of hardware, and the driving of the network requires additional hardware (e.g., PSR, PLS, NTC, etc.).

(II) A conventional type subscriber line scanner requires a considerably large amount of wiring and hardware, which subscriber line scanner is necessary for detecting a calling subscriber and connecting his line to subscriber circuits through a concentration switch.

(III) A separate trunk frame is provided for sending ringing and ring-back tone to subscribers and supplying a ring-trip and speech current. Such a separate trunk frame is necessary because the functions of a space-division switching system are designed to be fulfilled separately. If, however, the aforesaid functions are compounded with those of the subscriber line circuits and other equipment, the amount of hardware can be so reduced that the separate trunk frame can be dispensed with.

The present invention eliminates the aforesaid cause (I)–(III), to provide new type of electronic switching system which is small in size and economical.

Firstly, in order to reduce the number of switch driving devices, as referred to in the aforesaid item (I), a space-division speech-path with an ability of withstanding a high voltage is introduced. The electronic contact speech-path has advantages in that it is very compact and suitable for mass-production, that its driving speed can be made as fast as that of time-division switching systems, that it can be directly driven at the voltage level of logic circuits, and that it enables extreme simplification of the switching network controller NTC of FIG. 1 and removal of the bus selecting relays R and pulsers PLS of FIG. 1. Secondly, as regards the aforesaid cause (III) relating to the trunk frame TF, common subscriber circuits are used for solving the difficulties. More particularly, the common subscriber circuits are formed by compounding the functions of the speech-path circuit at the terminal station equipment TSE of the PCM converter frame PCMF with the functions of supplying speech currents and transmitting signalling tones. When such common subscriber circuits are shared by a number of subscribers, the separate trunk frame TF can be dispensed with.

Figure 2B:
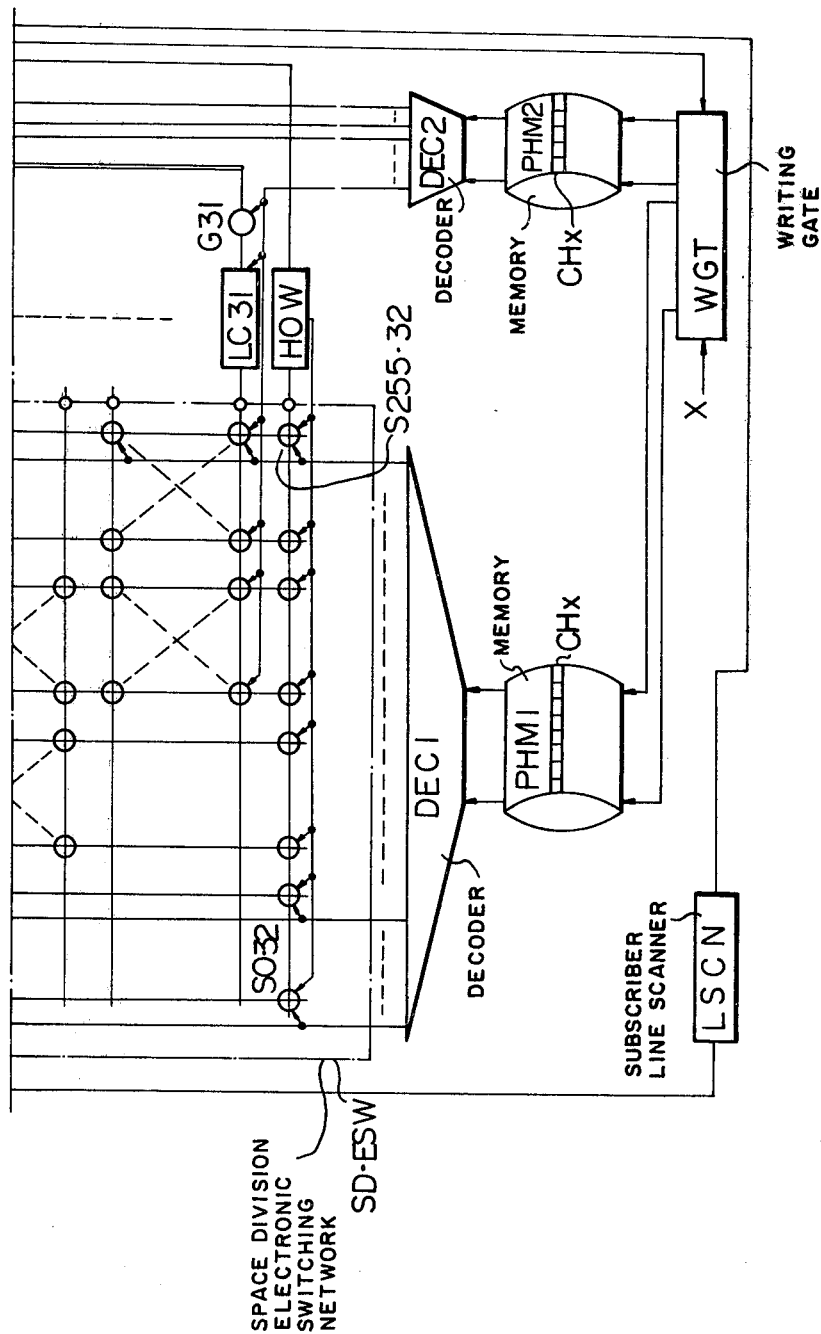

FIGS. 2(A) and 2(B) show a block diagram of an embodiment of the subscriber line scanning system according to the present invention, whose background has been described hereinbefore. In FIG. 2(A), SD-ESW is a space-division electronic switching network, wherein solid line circles at intersections of vertical and horizontal lines represent the presence of the "cross points", or cross point switching elements. The space-division electronic switching network SD-ESW is a speech-path network using electronic contact points as switching elements at each cross point therein, and the illustrated embodiment uses one stage transposition type network. The reason for using only one stage of said network SD-ESW is for the simplicity of the explanation which will be described hereinafter. Said limited-availability lattice type network is used because it reduces the cost by cutting down the number of cross points needed in such a one-stage lattice network. Thus, it should be understood that the present invention is not restricted by the illustrated embodiment.

Each cross point connection in the space-division electronic switching network SD-ESW is an electronic contact having a self-latching type, as shown in FIG. 3, and those electronic contacts are closed by X—Y two dimensional selection and held by a speech current or the like. In the illustrated embodiment, the cross point switching element is a thyristor switch.

Figure 4:
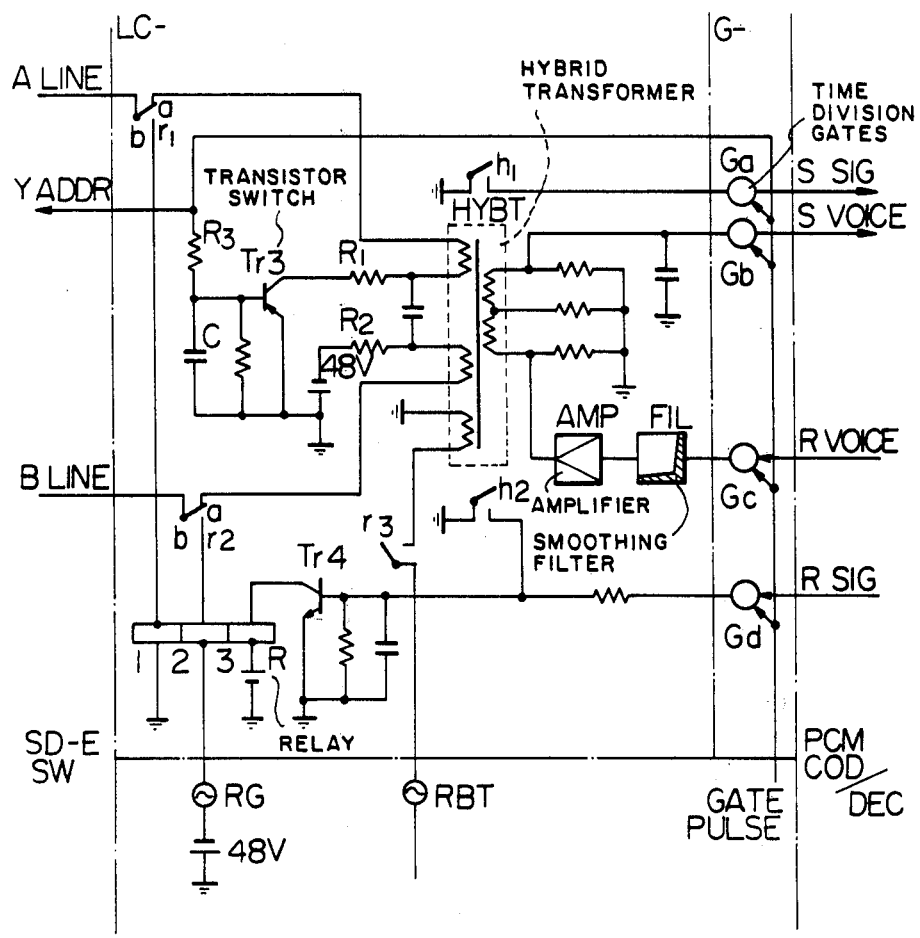
FIG. 4 is a circuit diagram of an example of a common subscriber circuit to be used in the system according to the present invention.

In FIG. 2(A), LC0 through LC31 are common subscriber line circuits which have the aforesaid functions for effecting time-division multiplexing, and LSCN is a subscriber line scanner. FIG. 4 shows an example of the details of such a common subscriber circuit. In the figure, HYBT designates a hybrid transformer for 2-wire to 4-wire conversion. In FIG. 4, $G_a$, $G_b$, $G_c$, and $G_d$ are time-division gates, and each of the circles G0 through G31 of FIG. 2(A) represent four gates of FIG. 4 as a group. In FIG. 4, Fil is a smoothing filter for the time-division pulses; Amp is a decoding amplifier; $Tr_3$ is a DC loop current cut off-control transistor switch for the thyristor switch open; $Tr_4$ is a transistor for driving a ringing signal transmitting relay R in response to an incoming call; and $r_1$, $r_2$, and $r_3$ are contacts of the relay R. Contacts $h_1$ and $h_2$ of a reed relay mounted on the hybrid transformer HYBT are held in the ON state by the exciting DC ampereturn of the primary winding of the hybrid transformer during speech.

The outgoing call connection and the switch matrix driving system therefor and the incoming call connection in the aforesaid embodiment will now be described.

(1) Outgoing call connection and the switch matrix driving procedure

Any call generation by a subscriber (for instance, the subscriber SUB0) is detected by the subscriber scanning, which scanning is periodically performed by the subscriber line scanner LSCN of a central processor unit (not shown). When detecting the call generation by the subscriber SUB0 through the subscriber scanning, the central processor unit effects the link matching by a conventional method while using the information relating to the subscriber storing address, which information is transmitted together with the scanning information, so as to write a predetermined information into an idle channel of the channels 1 through 23 of the memories PHM1 and PHM2 (e.g., the channel $CH_x$; refer to FIG. 2(B)) by the writing gate WGT, to close a predetermined gate (e.g., the cross point S0.8 in FIG. 2(A)).

The control of the writing by said writing gate WGT is carried out by a remote line concentrator and a intra-office line concentrator in the following manner. Firstly, the control at the remote line concentrator is effected on the basis of write-control information which is given through the line concentrator controller LCC. The exchange of control information between the line concentrator controller LCC and a master station is essentially the same as that in the case of the data handler DHR of FIG. 1(B). More particularly, the time slot of one channel of the PCM-24 system (e.g., the 24th channel) is used as a constituent of a multi frame (e.g., a multi frame having six frames) and separately transmitted in a six-phase (or rhythm) fashion. Accordingly, the aforesaid write information for memories PHM1 and PHM2 is transmitted to the writing gate WFT by using, for instance, phase 3 through phase 6 of the 24th channel. In the case of the intra-office line concentrator, the write information is directly applied to the X-terminal of the writing gate WGT from the central processor unit.

Upon receiving the write information, the writing gate WGT writes predetermined information at storing areas of the memories PHM1 and PHM2, which area are read out at the every time of the aforesaid channel $CH_x$, respectively. More particularly, an 8-bit information corresponding to the address of the calling subscriber SUB0 is written in the memory PHM1, while a 5-bit information for opening the gate G8 for the common subscriber line circuit LC8 connected to the cross point S0.8 is written in the memory PHM2. Thus, the information written in the memories PHM1 and PHM2 are read out every time the moment of the specified channel $CH_x$ comes, to extend the information at the decoders DEC1 and DEC2. The electronic contacts at the cross point S0.8 of the space-division switching network SD-ESW are closed by the X-Y two-dimensional selection of the output from the decoders DEC1 and DEC2. The time-division switch gate G8 is opened by the output from the decoder DEC2 at each channel $CH_x$, so as to perform the time-division multiplexed the voice of the subscriber SUB0 into the time slots of the channel $CH_x$, which voice is transmitted to the common subscriber circuit LC8 through the aforesaid cross point S0.8.

Here, the power supply to the subscriber SUB0 is accomplished from the common subscriber line circuit LC8, by using the gate pulses for opening and closing the gate G8. More particularly, the transistor switch $Tr_3$ of FIG. 4 is closed by a signal formed by integration of this gate pulse, so that, as long as the gate pulse is periodically delivered or as long as the subscriber SUB0 is talking, the conductive state is maintained for supplying the speech current, as shown in FIG. 3-(a) by the dotted lines with arrows. This speech current also acts to hold the electronic contacts of the cross point S0.8 closed, which electronic contacts are thyristors or TRIAC's.

The time-division multiplexed voice information delivered from the gate G8 is coded in the PCM mode, for instance, by the PCM converter PCM COD/DEC, and further multiplexed to the desired speed for time-division switching.

When the talk is finished and the information written in the channel $CH_x$ of the memories PHM1 and PHM2 is erased by an instruction from the central processor unit, the input to the transistor switch $Tr_3$ is interrupted to turn off the transistor switch, so that the speech current to the subscriber SUB0 is cut off and the holding current through the electronic contacts at the cross point S0.8 is interrupted to open the contacts. Thus, the operation for the talk is completed.

It should be noted here that the construction and the switch matrix driving circuit of the memories PHM1 and PHM2 are particularly important, and with the construction according to the present invention, the control of both the space-division switching network SD-ESW and the time-division switches can be accomplished by one common circuit configuration. More particularly the X-axis driving of the space-division switching network SD-ESW can be accomplished by a speech path holding memory whose structure is identical with that for driving one row (256×1) or one column (1×256) of a conventional high-way switch, while the Y-axis driving can be accomplished by the driving circuit for the time-division gates. Thus, the outstanding effect of the present invention can be achieved, which include the elimination of the complicated structure of the driving circuit for conventional space-division switches, so as to allow miniaturization and economization of the switch drivers and the line concentrating devices, and simplification of the processing of the output from the central processor unit by removing the need for attention to the space-division switches in controlling such processing. The aforesaid outstanding effects are the primary features of the present invention. The use of the electronic contact speech path elements in the form IC and the aforesaid driving circuit of time-division speech path type facilitate the amount of hardware in the space-division switching frame, for instance, from conventional two frames per about 500 terminals of a line concentrating switch equipment to 20 to 30 sheets of medium size packages. Thus, the size of the line concentrating stages can be reduced to about one tenth that of conventional corresponding stages. The amount of wiring can be drastically reduced, as pointed out above, and in addition, the mounting labor and power consumption of the line concentrator can be greatly reduced and its economy is vastly improved, as compared with those of conventional equipment.

(2) Incoming call connection

At the time of an incoming call connection, the called subscriber (e.g., the subscriber SUB0) is connected to the common subscriber line circuit (e.g., the common subscriber line circuit LC8) in the same manner as described in the preceding paragraph (1) with regard to the outgoing call connection and the switch matrix driving circuit therefor, simply by writing in the specified channels of the memories PHM1 and PHM2, e.g., the channel $CH_y$ (although the channel $CH_y$ is not shown in FIG. 2(B), the shown channel $CH_x$ may be read for it), through the descent circuit of the third phase through the sixth phase of the 24th channel of the PCM-24 system in the case of a remote line concentrator switch, or through the write gate WGT directly from the X-point in the case of an intra-office line concentrating switch. At this moment, since bell-ringing signals must be sent to the called subscriber SUB0, the signalling bit of the channel $CH_y$ (the so-called "S" bit, and one such bit is inserted in each six PCM frames in the so-called new PCM-24 system) is turned to "1" by the central processor unit, whereby, for instance, the transistor $Tr_4$ of FIG. 4 is turned on, to actuate the relay R and to switch the contacts $r_1$ and $r_2$ to sides b, and the 16 Hz bell-ringing signals, which are superposed on a −48 volt power source, are transmitted through feeders 1 and 2. Simultaneously, a ring-back tone RBT is sent to the calling party through an auxiliary winding of the hybrid transformer HYBT. When the called subscriber SUB0 lifts up his receiver, a direct current flows through the windings 1 and 2 of the relay R so as to cancel the magnetomotive force of the winding 3, and said relay R returns to the previous state to return the contacts $r_1$ and $r_2$ to side a. Contact $r_3$ is then opened to stop the ring-back tone. At this moment, since the transistor switch $Tr_3$ is closed by the gate pulse, the speech current is supplied through the hybrid transformer HYBT. Accordingly, the reed switch mounted on the hybrid transformer HYBT is turned on, and the reed switch contact $h_1$ controls the sending side 3 bits, while the other reed switch contact $h_2$ interrupts the input to the transistor Tr4. In other words, ring trip operation takes place. Thus, the circuit enters into the regular talking mode, so that it is sufficient for the central processor unit to execute the return of the receiving side S bits from "1" to "0" by the end of the talk. When the subscriber's handset is still off the hook for an extended period of time, the telephone office sends out a howler tone (with a maximum of about +32 dB$_m$), and in this case, the subscriber whose handset is still off the hook is reconnected to the howler tone source (conventional technique) in a howler trunk HOW by using, for instance, the second phase time slot of the 24th channel. Cross points S0.32 through S255.32 are for this purpose. Although only one howler trunk HOW is shown, the number of howler tone trunk is not restricted. Whether the subscriber scanning is halted or not during the howler tone transmission is a matter of design choice, and it will not be discussed here.

The foregoing description only explains the fundamental principles of the present invention, and such description does not restrict the invention, such as the number of space-division switching network SD-ESW stages, the alteration of circuit constants, or the method for using the channels. It is apparent to those skilled in the art that various modifications, structural types, and different usages thereof are possible within the scope of the invention.

Figure 5:
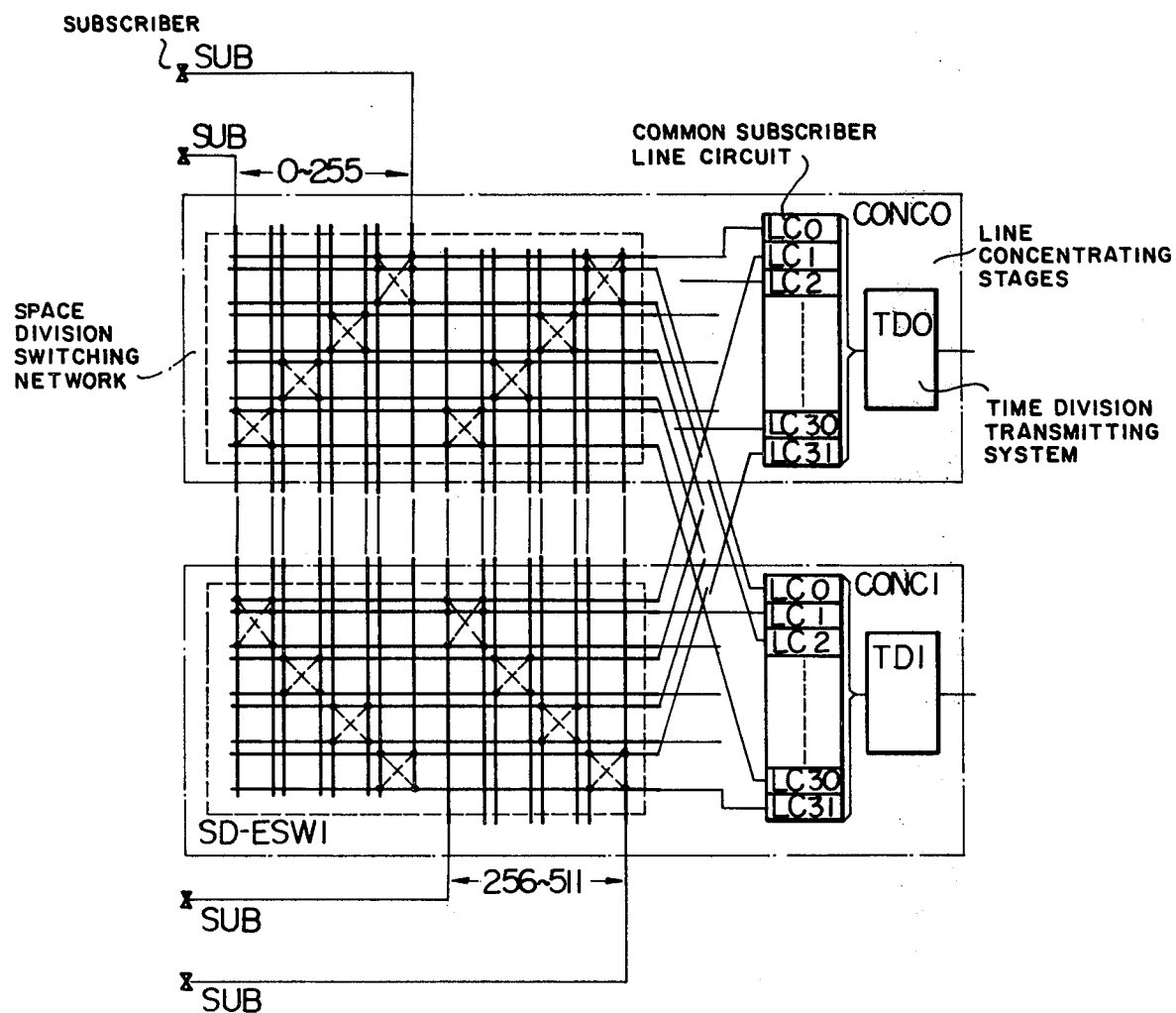
FIG. 5 is a block diagram of another embodiment of the present invention, which embodiment is made fail-safe.

FIG. 5 is a block diagram of another embodiment of the present invention. This embodiment uses two systems of the line concentration switch equipment shown in FIG. 2, to expand the connecting capacity to 512 subscribers and to provide the fail-safe feature without the necessity of any extra hardware and without causing any sacrifice in the regular traffic conditions.

In FIG. 5, CONC0 and CONC1 are line concentrating stages equivalent to those shown in FIGS. 2(A) and 2(B), respectively; TD0 and TD1 are time-division transmitting systems, each of which includes a time-division switch, a PCM converter, and a remote line concentrator controller of the line concentrating switch equipment shown in FIGS. 2(A) and 2(B); LC0 through LC31 are common subscriber line circuits equivalent to the corresponding common subscriber line circuits of FIGS. 2(A) and 2(B); and SD-ESW0 and SD-ESW1 are space-division switching networks, respectively.

Each space-division switching network SD-ESW0 or SD-ESW1 is so structured as to form a one-stage transposed multiple lattice having 512 incoming lines and 32 outgoing lines, and the corresponding incoming lines of the two space-division switching networks SD-ESW are connected to each other in an input multiplex fashion and coupled to the subscribers SUB. The outgoing lines of the two space-division switching networks SD-ESW0 and SD-ESW1 are connected to the common subscriber line circuits of the line concentrating stages CONC0 and CONC1 in a crossing fashion, respectively. More particularly, even-numbered outgoing lines are connected to the common subscriber circuits LC0 through LC31 of the line concentrating stage CONC0 and the odd-numbered outgoing lines are connected to the common subscriber circuits LC0 and LC31 of the other line concentrating stage CONC1, while the outgoing lines of the space-division switching network SD-ESW0 are connected to even-numbered circuits of the common subscriber circuits LC0 through LC31 and while the outgoing lines of the space-division switching network SD-ESW1 are connected to odd-numbered circuits of the common subscriber circuits LC0 through LC31.

Here, each of the space-division switching networks SD-ESW0 and SD-ESW1 is such a one-stage transposed multiple type, switching network in which each input terminal can be connected only to 8 outgoing lines and each outgoing line can be connected only to 128 subscribers. Thus, with such space-division switching networks SD-ESW0 and SD-ESW1, there are 16 outgoing lines available for each subscriber SUB, and the traffic conditions of this embodiment become identical with those of the preceding embodiment, as shown in FIG. 2, without causing any increase in the cross points in the switch matrix.

With the structure described above, even when a single failure or simultaneous failures occur, involving at least one of one or both of the time-division transmitting systems TD0 and TD1, one of the common subscriber circuits LC0 through LC31 of the line concentrating stages CONC0 and CONC1, and one of the space-division switching networks SD-ESW0 and SD-ESW1, communication can be carried out without failure despite the presence of negative effects on the traffic conditions caused by such failure. accordingly, the reliability of the line concentrating system of the switching equipment becomes very high.

It should be noted that according to a conventional exchange system, a central exchange system must drive a bell ringer of each subscriber using D.C. current, and therefore, many bell-ringing circuits must be provided in a central exchange system. However, according to the present invention, a bell-ringing circuit can function on a time divisional basis. Thus, the structure of the bell-ringing circuit can be simplified as will now be explained.

Now, the modification of FIG. 2 will be explained with reference to FIG. 6. In FIG. 6, the same symbols as in FIG. 2 indicate the same members as in FIG. 2.

Referring to FIG. 6, CD is a subscriber state detector, only one of which is provided for the 256 subscribers, and FIG. 7 illustrates the circuit construction of an example of the detector CD. In said subscriber state detector CD of FIG. 7, Tr is a transistor switch which selectively cuts off a detecting current flowing therethrough, for controlling the return of a conductive cross point, i.e., one of the cross points S0-33 through S255-33, to a non-conductive state; PC is a photo-coupler detecting the state of each subscriber by optical switching in response to the state of the subscriber SUB0 through SUB255; F/F is a flip-flop for temporarily storing the detected information, the flip-flop is of a set-reset type which response to the shifting of its input signal from a positive potential to a negative potential; and G0 through G4 are NAND gates.

Figure 6B:
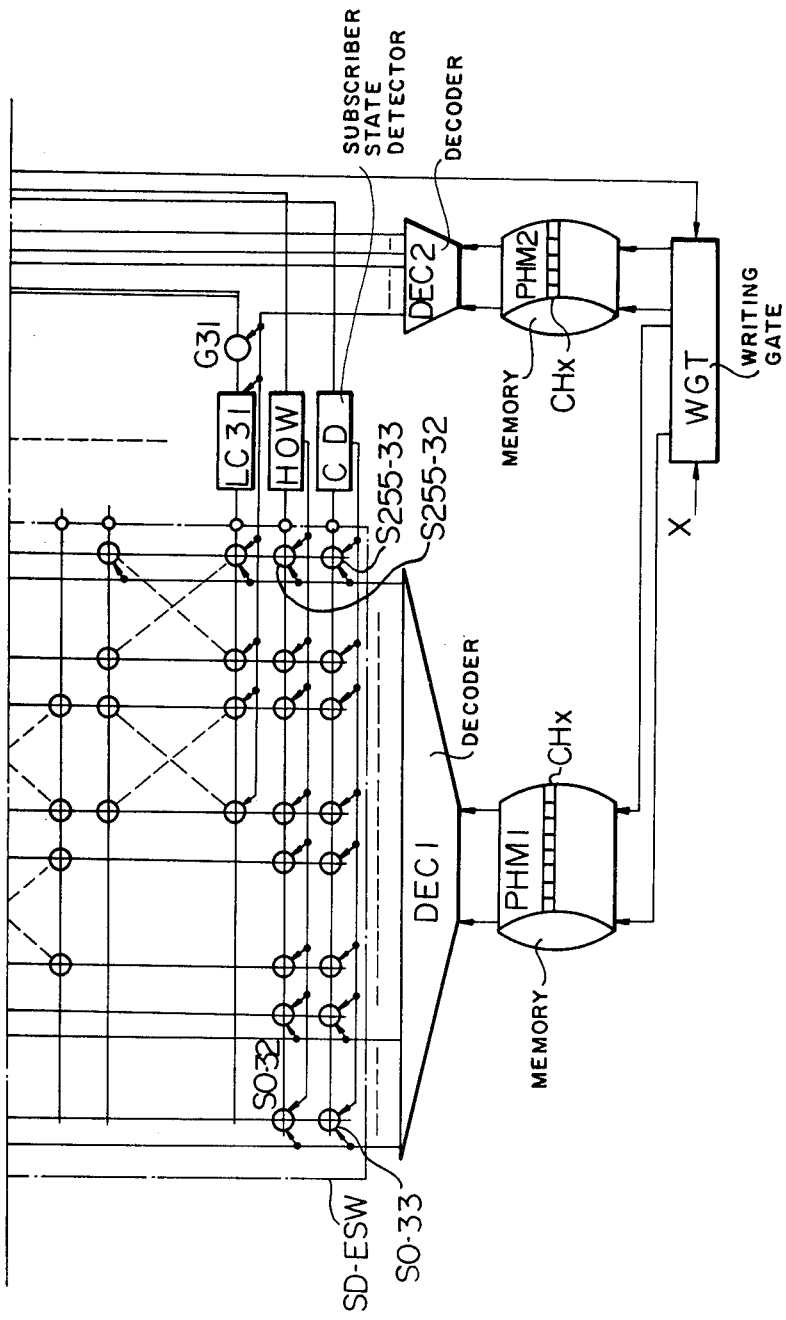

In FIGS. 6(A) and 6(B), LC0 through LC31 are common subscriber circuits, which are essentially the same as the speech-paths provided in the terminal station equipment TSE of the PCM switching frame PCMF in the line concentrator of FIG. 1, but the common subscriber circuits LC0 through LC31 have the additional functions of supplying speech current and transmitting signal tones and the like along with the functions of the aforesaid speech-paths; and DEC1 and DEC2 are decoders which extend 8-bit or 5-bit inputs into $2^8 = 256$ or $2^5 = 32$ outputs by decoding. In the figure, PHM1 and PHM2 are conventional cyclic read out type memories which are commonly used as holding memories in time-division speech-paths; WGT is a write gate which controls the writing into said memories PHM1 and PHM2; and LCC is a line concentrator controller corresponding to the data handler DHR in the line concentrator of FIG. 1(B), which line concentrator controller is accomplished by conventional techniques. Since the detailed structures of individual elements in the aforesaid various equipment are not the subject of the present invention, such details will not be discussed here.

The process of scanning the subscriber lines in the line concentrating switching equipment of the aforesaid construction will now be described.

It is well-known that any demand for a call by a subscriber SUB is detected by subscriber line scanning. Conventionally, the subscriber line scanning has been carried out in the following manner. Namely, a two-state detecting element is provided so as to correspond to each subscriber, to detect the loop/off of the subscriber line, and the two-state detecting elements are arranged in a matrix set. Said matrix set is scanned by a scanning device, to detect the state of each subscriber through parallel reading by word. Accordingly the amount of wires incoming to and outgoing from said two-state detecting elements is enormous, and the amount of hardware of the scanning device is considerably large, also.

With the embodiment of the present invention, as shown in FIGS. 6(A) and 6(B), for instance, only one subscriber state detector CD is provided for 256 subscribers, and the subscriber line scanning is carried out by successively connecting the detector CD to each subscriber by successively closing the cross points S0-33 through S255-33, which cross points are disposed along one row of the space-division electronic switching net work SD-ESW.

Figure 8C:
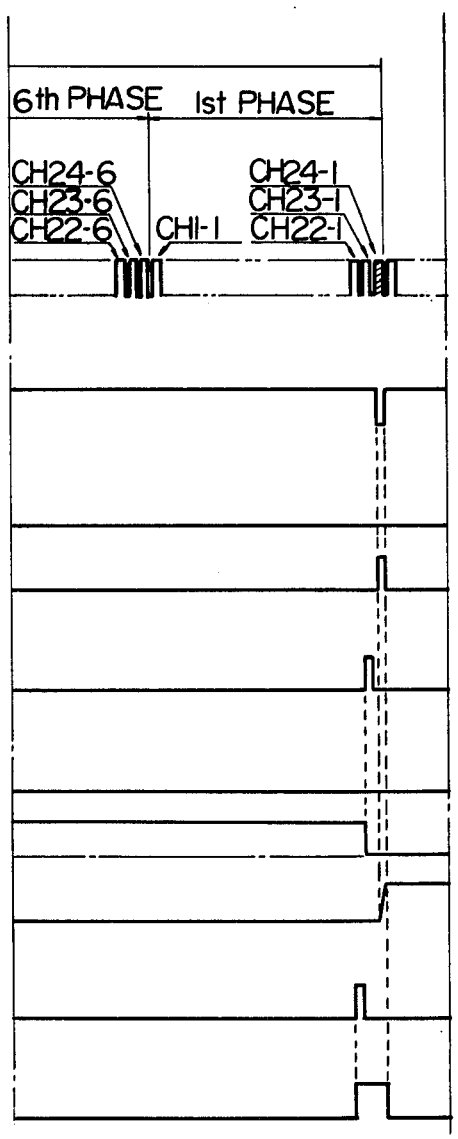

Now, the memories PHM1 and PHM2 are assumed to be random written and read out in a periodic fashion by channel clocks of the PCM-24 system. The exchange of control information between the line concentrator controller LCC and a central station is essentially the same as that in the case of the data handler DHR of FIG. 1(B). More particularly, the time slot of one channel of the PCM-24 system (e.g., the 24th channel) is used as a constituent of a multi frame (e.g., a multi frame having six frames) and separately transmitted in a six-phase (or rhythm) fashion. The information for scanning the subscriber lines is also exchanged by using one phase thereof, for instance, by using the first phase (which will be referred to as CH24-1, hereinafter). The curve (i) of FIG. 8 illustrates the timing chart of the aforesaid multi frame, the six-phase, the channels, and the time slots. In the figure, the hatched channels represent the channel CH24-1 which is assigned to the subscriber line scanning.

As is apparent from said pulse wave form 1 of FIG. 8(A), the channel CH24-1 occurs at periodic intervals of 750 uS (=125 uS×6). Driving pulses for each cross point are sent out from the subscriber state detector CD and the decoder DEC1, in response to the occurrence of said channel CH24-1. More particularly, whenever this channel CH24-1 occurs, an X-drive pulse having negative polarity is generated by the subscriber state detector CD with the timing, as shown in the pulse wave form 2 of FIG. 8(A). In response to the information reading by the memory PHM1, a Y-drive pulse having positive polarity is successively generated from the output terminals 0, 1, . . ., 255 of the decoder DEC1, as shown in the pulse wave form 3 of FIG. 8(A).

It is now assumed that the output terminal 0 of the decoder DEC1 has just produced a Y-drive pulse at a given channel CH24-1. At this moment, the subscriber state detector CD of FIG. 7 acts to invert a control pulse from the line concentrator controller LCC, which pulse corresponds to the CH24-1, by a NAND gate G2, so as to apply the thus inverted pulse to the space-division electronic switching network SD-ESW as an X-drive pulse. Accordingly, the X- and Y-drive pulses are simultaneously applied to the cross point S0-33, so as to cause an electric current to flow through photo-coupler diodes therein, to emanate light beams therefrom. Photo-transistors receiving those light beams act to trigger thyristor switches to make the thyristors turn on. At this moment, if the subscriber SUB0 is in a hook-up state, a D.C. loop is formed through the line of the subscriber SUB0, so that a detecting current flows through a detecting loop circuit tracing from the ground through the transistor switch Tr, the cross point S0-33, the subscriber SUB0, the cross point S0-33, and the light emitting diode of the photo-coupler PC, back to the grounded battery. Thus, the cross point S0-33 is closed and the self-latching function of the thyristor switch keeps the cross point closed. On the other hand, if the subscriber SUB0 is not in the hook-up state, the D.C. loop through the subscriber SUB0 is interrupted, so that the aforesaid detecting loop circuit is opened at the subscriber SUB0 and the electronic switch at the cross point S0-33 is not closed. The solid lines with a heading S0-33 in the pulse wave forms 5 of FIG. 8(A) represent the timing of the aforesaid detecting current in the case of the subscriber SUB0 hoop-up, while the dashdot lines with the same heading in said pulse wave forms 5 indicate the absence of the detecting current in the case of the subscriber SUB0 hoop-down. As shown in the pulse wave forms 4 of FIG. 8(A), the input signal to the base of the transistor switch Tr is at a zero potential only during the period corresponding to the first phase of the 23rd channel, i.e., channel CH23-1, and at a negative potential the rest of the time, so that the transistor switch Tr is normally closed or conductive. Accordingly, the contact at the cross point S0-33 is kept closed until the next CH23-1 in the succeeding first phase PCM frame occurs. More paticularly, when the input to the base of the transistor switch Tr rises to said zero potential at the aforesaid next CH23-1, this transistor switch Tr is turned off to interrupt the aforesaid detecting loop circuit, so that the detecting current holding the thyristor switches at the cross point S0-33 is cut off, to turn off said thyristor switches. The extreme right end of the pulse wave form S0-33 in the curves pulse wave forms 5 of FIG. 8(A) represents the timing of this turn off.

The subscriber state detector CD, as shown in FIG. 7, acts to turn on the switch at the cross point S0-33, so as to determine the state of the subscriber SUB0 based on whether the aforesaid detecting loop circuit is completed or not. More particularly, if the subscriber SUB0 is in the hook-up state, the aforesaid turn-on of the cross point switch completes the detecting loop circuit, and the light emitting diodes of the photo-coupler PC emanates light beams in response to the detecting current through the detecting loop circuit. A photo-transistor is optically coupled to the light emitting diode, so as to detect the light beams emitted therefrom, and the result of the detection is applied to a NAND gate G1 through a NAND gate G0. The other input terminal of the NAND gate G1 receives a gate signal from the line concentrator controller LCC, which gate signal corresponds to the channel CH22-1, as shown in the pulse wave forms 6 of FIG. 8(A). Accordingly, the output of the NAND gate G1 is kept at the high potential until the 22nd channel of the next first phase PCM frame, i.e., the aforesaid channel CH22-1. At the time of the channel CH22-1, the NAND gate G1 is opened, and the output from the NAND gate G1 shifts from the high potential to the low potential, depending on the outcome of the logical product of the NAND gate G0 input and the channel CH22-1. This shift of the NAND gate G1 output sets the flip-flop F/F, whose set input is the output from the NAND gate G1. The pulse wave forms 7 of FIG. 8 shows the timing of the flip-flop F/F setting. When the next channel, i.e., channel CH23-1, occurs, a high potential input signal is applied to the base of the transistor switch Tr, as pointed out before. Accordingly, the transistor switch Tr is turned off, to interrupt the detecting current, whereby, the emission from the light emitting diode of the photo-coupler PC is ceased, and simultaneously, the cross point S0-33 switch being held closed by the detecting current is now turned off. On the other hand, if the subscriber SUB0 is not in the hook-up state, a detecting loop is not formed even if the cross point switch is triggered in the aforesaid manner, so that no detecting current is supplied to the light emitting diode of the photo-coupler PC. Accordingly, said light emitting diode does not emit any light beams, and the flip-flop F/F is not set even when channel CH22-1 occurs, as depicted by the dash-dot lines of the pusle wave forms 7 of FIG. 8(A).

If should be noted here that the subscriber state detector CD mainly consists of resistor elements and semiconductor elements, without using any inductive elements and capacitive elements, so that no transient oscillation is caused as the cross point switches are closed and opened. The only capacitive current is the charging current of the line static capacitance (e.g., 0.05 $\mu$F/Km), which charging current lasts from about several uS to several tens uS starting from the closing of the cross point switches. Thus, there is not the slightest possibility of false detection due to the aforesaid line charging current at the moment of setting the flip-flop in response to channel CH22-1 occurring about 700 $\mu$S later. A commonly-used telephone set includes a bell circuit (consisting of a series circuit having a 0.9 $\mu$f capacitor, a 61 H coil, and a 4.2 K$\Omega$ resistance), which circuit is connected across end terminals of the telephone set. Thus, an electric current flows into this bell circuit after the charging current of the line capacitance. Despite the current through the bell circuit, it is possible to maintain a ratio of more than 2 between the photo-coupler PC current for on-hook conditions and the photo-coupler PC current for off-hook conditions, even under the following extremely unfavorable detecting conditions of the net resistance, as seen from the photo-coupler PC. Namely, For on-hook (with a zero line resistance), 4.2 K$\Omega$+0$\Omega$+0.5 K$\Omega$(intra-office)=4.7 K$\Omega$ For off-hook (with a maximum foreseeable line resistance) 0$\Omega$+1.5 K$\Omega$+0.5 K$\Omega$(intraoffice)=2.0 K$\Omega$ Thus, it is very easy to discriminate such photo-coupler PC currents for on-hook and off-hook conditions by the subscriber state detector CD, using conventional techniques.

The detected state information for the subscriber SUB0, which is temporarily stored in the flip-flop F/F in the aforesaid manner, is applied to the line concentrator controller LCC at the channel CH24-1. More particularly, the NAND gate G3, to which the output from the flip-flop F/F is connected, is opened by a control pulse corresponding to the aforesaid channel CH24-1, so as to transfer the detected state information of the subscriber SUB0 to the line concentrator controller LCC. It should be noted that the aforesaid control pulse is also applied to the reset terminal of the flip-flop F/F, which is reset by the trailing end of said control pulse, simultaneously with the closing of the NAND gate G3.

Thus, the detection of a call by the subscriber SUB0 is completed. The control pulse corresponding to channel CH24-1 is inverted by the NAND gate G2, and the inverted pulse is applied to the space-division electronic switching network SD-ESW as an X-driving pulse, to initiate the detection of a call by the next following subscriber SUB1. Similarly, the detection of calls by other subscriber is successively carried out in the same manner, and upon completion of the call detection for the last subscriber SUB255, the control returns to the detection of the call of the first subscriber SUB0. Accordingly, the call detecting time interval for a specific subscriber (e.g., SUB0) is as follows.

$$0.75 \text{ mS} \times 256 \times 192 \text{ mS}$$

This subscriber scanning period 192 mS is substantially acceptable electronic switching system.

As is apparent from the foregoing detailed disclosure, with a subscriber scanning system according to the present invention, the only additional hardware necessary for subscriber scanning is 256 pairs of cross point switches per 256 subscribers, and one circuit of a subscriber state detector per 256 subscribers. Here, if the aforesaid cross point switches are made by the thyristor switches, as shown in the embodiment of FIG. 7, it is possible to form 16 (4×4) pairs of the switches in one chip of integrated circuit (IC) in view of the present state of the art, and a higher degree of integration may be possible as the art is further improved. Consequently, the hardware for subscriber line scanning at the line concentrating stage can be fabricated, for instance by thyristor switches mountable in 16 IC chips and one subscriber state detector circuit mountable in one or two IC chips (actually, the thyristor switches are distributed in a plurality of packages by being mounted in the same chip with the speech-path cross points or the cross points for connecting a howler tone or the like). Thus, the 200 to 300 packages of hardware per 256 subscriber lines in conventional systems can be cut down to only one package by the system according to the present invention. Furthermore, conventional systems require input/output lines leading to a two-state (loop/off) detecting element for each subscriber line, but the system according to the present invention eliminates such individual input/output lines by substituting a single output line added in a printed circuit of the switching network, so that the enormous amount of wiring needed for the scanning circuit in conventional systems (for instance, about 1,000 wires per 256 subscribers) can be substantially eliminated. Thus, the present invention results in a drastic reduction of the wiring work, the manufacturing manpower, and the testing manpower. In contrast to the conventional parallel reading of the call detector output, the present invention uses a time-division serial reading, so that only one pair of output lines from the subscriber state detector is sufficient for 256 subscriber terminals and the output lines are greatly simplified, as compared with those of conventional systems.

In addition, if, for instance, 32 units of the aforesaid line concentrating stages are assembled and a buffer memory with 32-bit words is used for input information exchange between a central processor unit (organized for 32-bit words) and the line concentrating stages, then 8,912 (256×32) subscriber lines can be scanned as a group.

Next, the structure of a cross point in FIGS. 2(A) and 2(B) and FIGS. 6(A) and 6(B) will be explained in accordance with FIGS. 3(a) through 3(d). Each cross point connection in the space-division electronic switching network SD-ESW is a balanced two-wire type switch which uses an electronic contact and has self-latching ability, as shown in FIG. 3, and this electronic contact is closed by X—Y two dimensional address selection and held by the speech current.

Figure 3A:
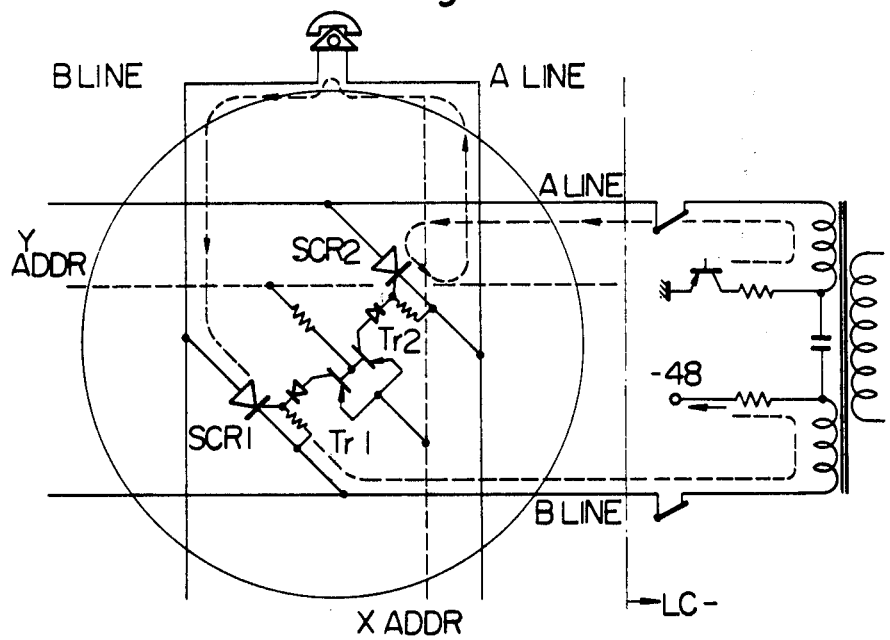
FIGS. 3a through 3d are circuit diagrams, illustrating different examples of electronic contacts to be used at corss points in a space-division switching network.
Figure 3B:
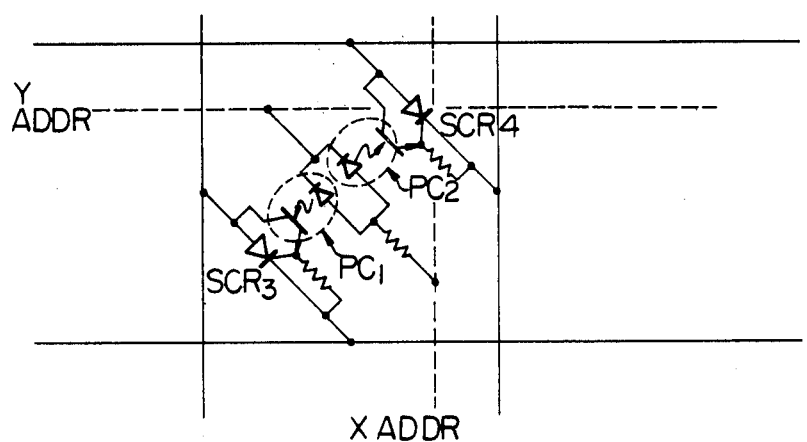
Figure 3C:
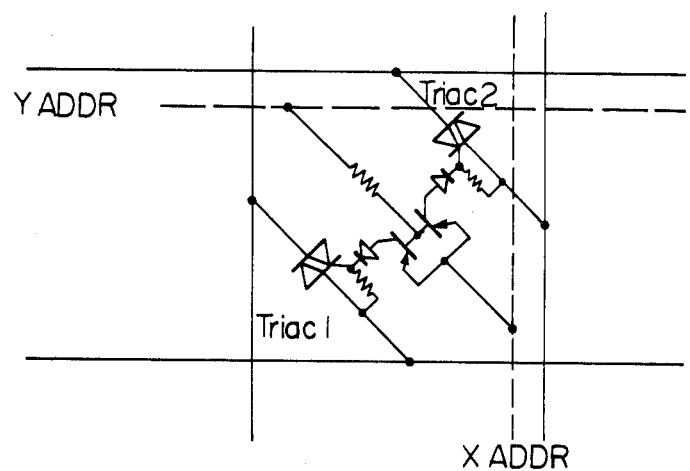
Figure 3D:
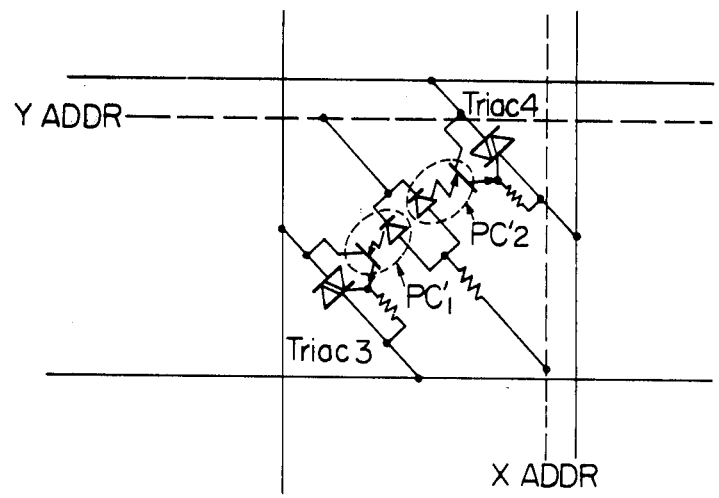

The dotted lines with arrows in FIG. 3(a) show an example of the battery current (then speech current) flowing through the space-division switching network SD-ESW when the subscribers are talking. FIGS. 3(a) and 3(b) illustrate embodiments using one-directional thyristors as electronic contacts, while FIGS. 3(c) and 3(d) illustrate embodiments using two-directional TRI-AC's. From another view point, FIGS. 3(a) and 3(c) show embodiments using transistors in the triggering circuits for the self-latching electronic contacts, while FIGS. 3(b) and 3(d) show embodiments using photocouplers therein. With the cross points as shown in FIGS. 3(b) and 3(d), it is possible to achieve a low-noise space-division switching network SD-ESW, because the light-receiving elements are controlled by light emitting elements which are optically coupled thereto and because the switching crosspoint elements can be completely separated electromagnetically from the selecting-driving elements therefor.

Figure 9A:
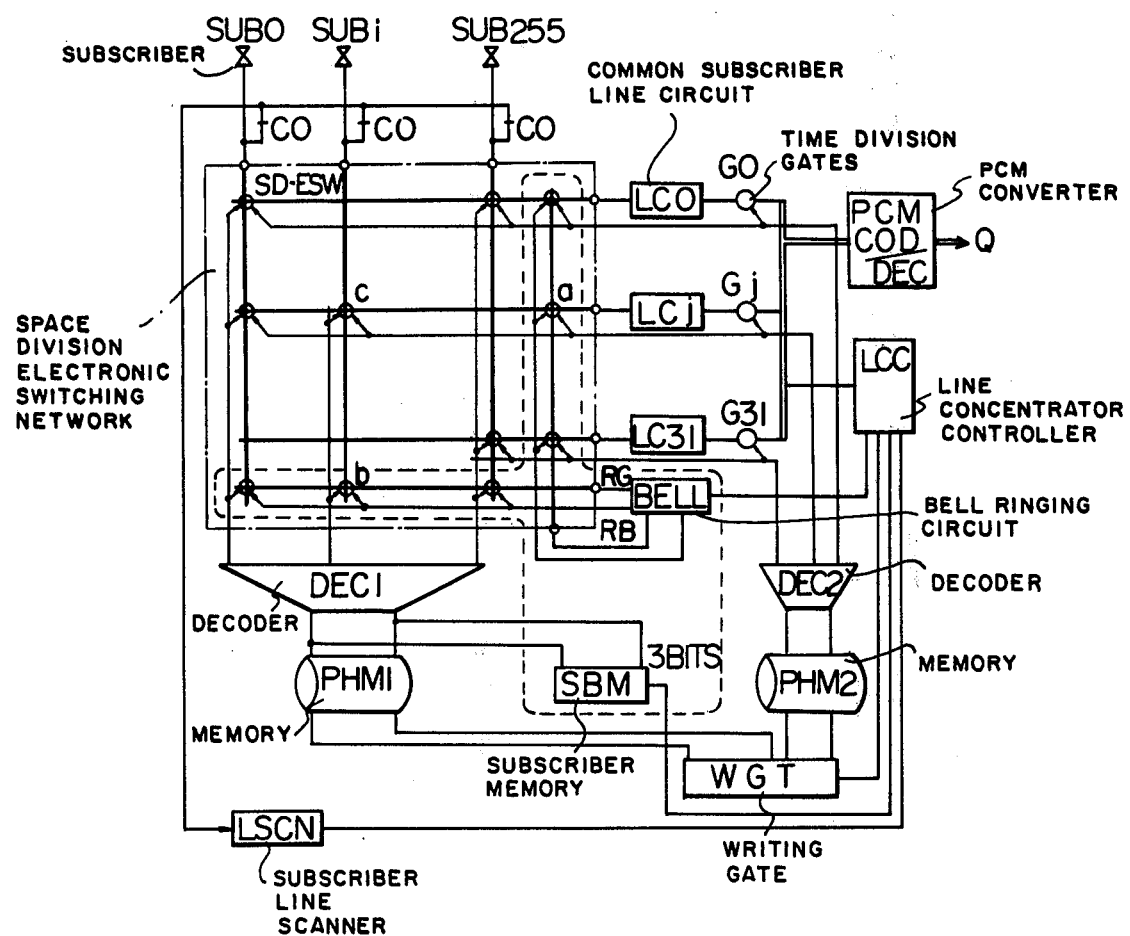
FIG. 9(A) and FIG. 9(B) show the modification of the structure of FIG. 2.
Figure 9B:
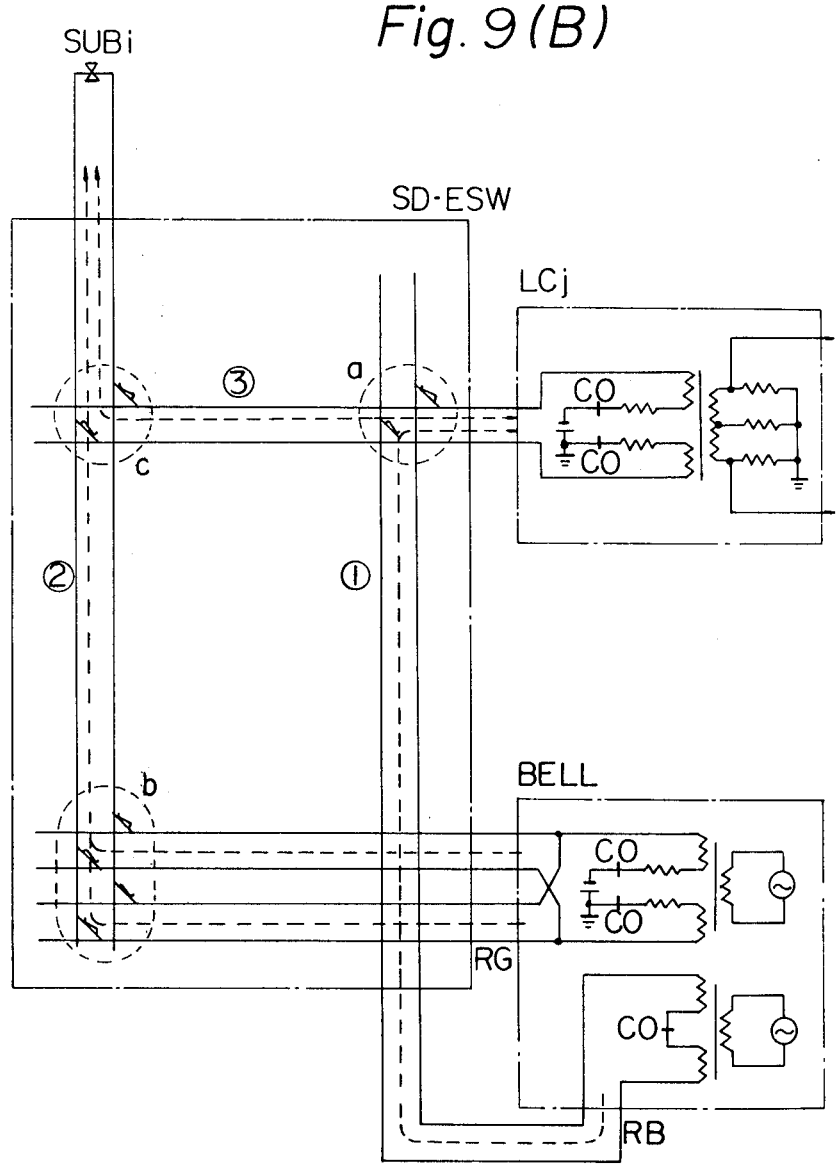

FIG. 9 (A) and FIG. 9 (B) show the modification of the structure of FIGS. 2(A) and 2(B), which modification provides a simple structure for the time divisional ring-trip function. In said figures the portion surrounded by the dotted line is attached to the structure of FIGS. 2(A) and 2(B), that is a single row of cross-points and a single column of cross-points are attached to the space division switching network of FIGS. 2(A) and 2(B). Said cross-points are connected to the ringing signal terminal RG or the ring back tone terminal RB of the bell-ringing circuit BELL. SBM is a subscriber memory having three bits for each subscriber, and is controlled by the address instruction from the output of the holding memory PHM1. The content of the subscriber memory SBM indicates the status of the subscriber; that is, (a) on-hook, (b) off-hook, (c) under calling operation, (d) under conversation, (e) under howler tone sending. In FIG. 9 (B), the bus used for each status described above is shown. During the calling operation, only buses 1 and 2 are effective, that is, the ring back tone is sent through bus 1, and the ringing signal is sent through bus 2. During conversation, only bus 3 is effective and the calling subscriber and the called subscriber can talk to each other therethrough. In FIG. 9(B), the symbol CO shows the contact for opening the electrical source to the BELL circuit to de-energize cross-points a and b when a response to the ringing signal is detected.

Figure 10:
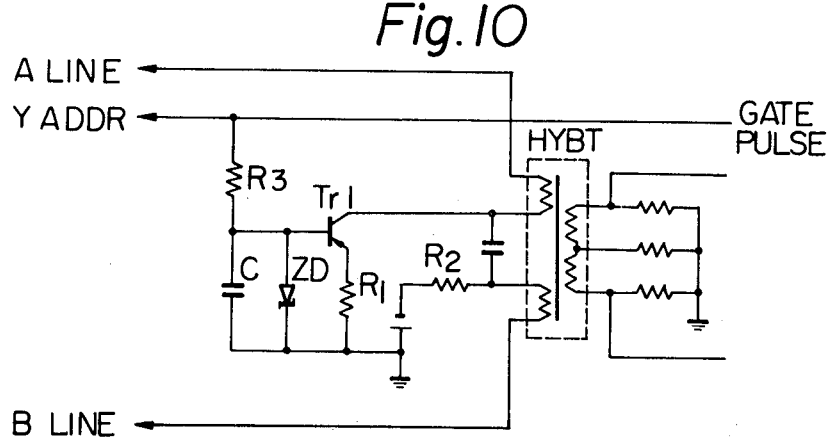
FIG. 10 is a circuit diagram of a speech current supply circuit.

FIG. 10 shows a circuit diagram of a speech current supply circuit which can be connected to the device of FIG. 2. In a subscriber line, direct resistance between a central office and a subscriber usually extends from 0 to 1500 depending upon the distance the subscriber is from said central office. Therefore, the speech current extends from 18.8 mA to 45.7 mA when a conventional voltage source is utilized as the speech current supply circuit. Since a telephone set is designed to be able to operate with the minimum of speech current (18.8 mA), excessive current when a subscriber is near a central office is useless. The speech current supply circuit of FIG. 10 solves the above problem by using a current source instead of a voltage source. The circuit of FIG. 10 is an other example for provided in each one of the common subscriber line circuits LC0 through LC31 in FIGS. 2(A) and 2(B). The time divisional gate pulse from the decode circuit DEC2 in FIG. 2(A) is received by the integrator having the resistor R3 and the capacitor C in FIG. 10. In this way, the capacitor C is charged. The voltage across said capacitor C can not exceed a predetermined value $V_z$ since the zenor diode ZD is connected parallel to said capacitor C. The potential of the emitter of the transistor $Tr_1$ is $V_z$-$V_{BE}$, where $V_{VE}$ is the saturation voltage between the base and the emitter. Therefore, the current in the resistor R1 inserted between said emitter and the ground is $(V_z - V_{VE}/R1)$ and the speech current in a subscriber line is $(V_z - V_{BE}/R1 \times \beta/1+\beta$, where $\beta$ is the current amplification factor of the transistor $Tr_1$. As is apparent from the above formula, a speech current in a subscriber line is neary independent from a line resistance, and is therefore constant. Since the gate pulse from the decode circuit DEC2 is supplied periodically to the capacitor C so long as speech continues, the voltage across said capacitor C is held to $V_z$ and a constant speech current can thereby be obtained.

Figure 11:
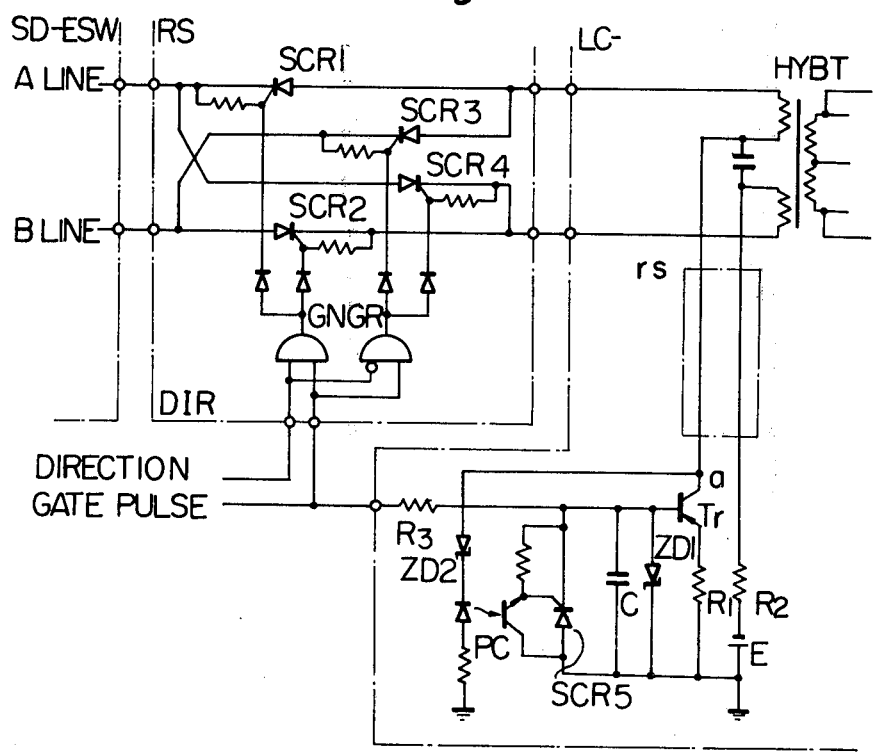
FIG. 11 is a modification of the circuit of FIG. 10.

FIG. 11 is a modification of the circuit of FIG. 10. The circuit of FIG. 11 has a polarity reversal circuit DIR, which indicates the polarity of a speech current according to the instruction signal "direction". Since the polarity of a speech current must be reversed with regard to a party-line system and/or a coin box station.

Figure 12:
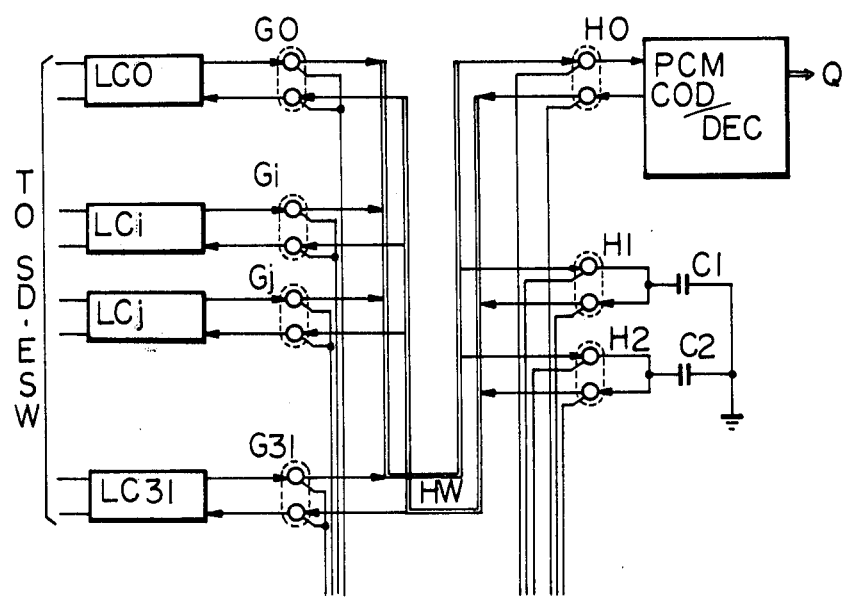
FIG. 12 shows another modification of the structure of FIG. 2.

FIG. 12 is an improvement of the circuit of FIGS. 2(A) and 2(B). FIG. 12 facilitates the intra group switching of a call in a concentrator itself. In the concentrator of FIGS. 2(A) and 2(B), all calls must be sent to the central office even when the called subscriber is connected to the same concentrator as the originating subscriber. FIG. 12 improves on the above problem by connecting the originating subscriber and the terminaling subscriber within the same concentrator. In FIG. 12, G0 through G31 are the first gate group, H0 through H2 are the second gate group, C1 and C2 are storage elements for storing an analog signal, and HW is a time division common bus. Each of the first gate group G0 through G31 has a pair of gates connected between one of the common subscriber line circuits LC- and the common bus. One of the second gate group, i.e., H0, is connected between said common bus and the common circuit PCM COD/DEC and other gates H1 and H2 are connected to the memories C1 and C2, respectively. Said memories C1 and C2 are capacitors for storing a time division multiplexed analog signal.

The operation of FIG. 12 when the terminaling subscriber is in the same concentrator as the originating subscriber is as follows. First, the originating subscriber and the terminating subscriber are connected to the common subscriber line circuits $LC_i$ and $LC_j$, respectively, and the capacitors C1 and C2 are assigned to the originating and terminating subscribers, respectively.

Next, gate $G_i$ connected to the common subscriber circuit $LC_i$, the receiving gate of gate H1, and the sending gate of gate H2 are opened at a particular time slot assigned to the originating subscriber. The speech of the originating subscriber is then sampled and stored in the memory C1 as an electric charge. Said charge in said memory C1 is read out at the time slot assigned to the terminating subscriber and is sent to the terminating subscriber through demodulation by the common subscriber line circuit $LC_j$. That is, gate $G_j$, the sending gate of gate H1 and the receiving gate of gate H2 are opened at the terminating subscriber's time slot, at which speech from the called subscriber is stored in the memory C2. The content of said memory C2 is read out at the originating-subscriber's time slot. The conversation is performed by repeating the above operation. The gate signal at any time slot is obtained from the holding memory PHM2. The memory C1 and C2 are realized not only by a capacitor but also by a charge-coupled-device (CCD). With the latter element, gate H- can be included in a memory.

Many modifications of FIG. 12 are possible. For instance, a plurality of common buses HW will improve the efficiency of an office line, and/or a common unit PCM COD/DEC.

Although the subscriber line scanning system according to the present invention has been described by referring to an embodiment in the form of a line concentrator, it should be understood that the invention is not restricted to such an embodiment, and the outstanding effects of the present invention can be achieved by applying the invention to conventional switching system. If the space-division electronic switching networks are formed in a multi-stage arrangement, the subscriber line scanning system according to the present invention can be easily applied to the switching matrix of a subscriber line receiving stage thereof.

From the foregoing, it will now be apparent that a new and improved subscriber line scanning system has been found. It should be understood, of course, that the embodiments disclosed herein are merely illustrative and are not intended to limit the scope of the invention in any way. Reference should be made to the appended claims, therefore, rather than to the specification, as indicative of the scope of the invention.

What is claimed is:

1. An electronic switching system comprising: a plurality of subscribers; a time division central exchange office; a space division switching network connected between each said subscriber and said exchange office for effecting speech paths for carrying speech current therebetween, said switching network having a plurality of self-latching electronic contacts on each cross point of said switching network; an electronic switch control circuit having a cyclic read out type memory and a decoder for decoding the output of said memory; said memory storing the information for periodically sending a switch drive pulse to each of said cross points; and said electronic contacts on each cross point being controlled by said switch drive pulse so as to maintain the capability of said speech paths to carry current even if circuit current is terminated.

2. An electronic switching system according to claim 1, comprising a subscriber line scanning system detecting the state of subscriber lines at a local switching system, wherein one row or column in each of the matrixes at a subscriber line terminating stage of said space-division switching network is assigned to subscriber line scanning, output lines from said one row or column are connected to a common line which is connected to the input terminal of a subscriber state detector, said subscriber lines being successively connected in a predetermined sequence to said subscriber state detector for successively detecting the state of the subscriber line by successively closing and opening electronic cross points belonging to said row or column of said switch matrix during subscriber line scanning and the result of said detection is sent out from the output of said subscriber state detector in the form of time-division multiplex scanned signals.

3. A line concentrating system in switching equipment for concentrating low-traffic calls by using a space-division electronic switching network and a time-division switch, characterized in that a plurality of common subscriber line circuits are provided, each of which has the respective function of supplying a speech current, coding and decoding time-division multiplaced signals, and transmitting tone signals; said common subscriber line circuits being connected to subscribers through the space-division electronic switching network and connected to time-division transmitting systems through the time-division switch; said space-division switching network consisting of a switching matrix using electronic contacts as switching elements at each of cross points therein; turn on and turn off of said switching matrix being controlled by a switch matrix control circuit, which control circuit is identically constructed with another control circuit for controlling the turn on and turn off of said time-division switch by using cyclic read out type memories and decoders.

4. A line concentrating system in switching equipment according to claim 3, characterized in that the control circuit controlling the turn on and turn off of the time-division switch is also used for controlling selective driving and returning of the output side of the last stage switching matrix in said space-division switching network.

5. A line concentrating system is switching equipment according to claim 3, characterized in that switching elements at each of the cross points of the space-division switching network consist of electronic contacts having self-latching ability, such as thyristors and TRIAC's, and the control of the return of the cross points is carried out by interrupting the holding current of the corresponding electronic contact by ceasing time-division gate pulses for interrupting speech current from the common subscriber line circuits.

6. A line concentrating system in switching equipment according to claim 5, characterized in that light-sensitive elements are used in firing circuits for the electronic contacts having self-latching ability at cross points of said space-division switching network, so that the firing of each cross point is effected by light emitting elements optically coupled with said light-sensitive elements.

7. A line concentrating system in switching equipment according to claim 3, wherein said space-division switching network is divided into a plurality of portions, each of which have a plurality of subscribers, and a plurality of time division multiplexed systems each of which is connected to the respective portion of said switching network.

8. The invention as defined in claim 3, wherein said electronic contact points are used as switching elements at cross points of said space-division switching network, one row or one column in each of the matrices at a subscriber line terminating stage of said space-division switching network is assigned for subscriber line scanning, output lines from said one row or one column are connected to a common line which is connected to the input terminal of a subscriber state detector, said subscriber lines are successively connected in a predetermined sequence to said subscriber state detector for successively detecting the state of the subscriber line by successively closing and opening electronic cross points belonging to that row or column of said switch matrix at the subscriber line terminating stage which is assigned for the subscriber line scanning, and the result of said detection is sent out from the output of said subscriber state detector in the form of time-division multiplex scanned signals.

* * * * *

UNITED STATES PATENT AND TRADEMARK OFFICE
CERTIFICATE OF CORRECTION

PATENT NO. : 4,150,258
DATED : April 17, 1979
INVENTOR(S) : Shigefumi Fujimoto, et al It is certified that error appears in the above-identified patent and that said Letters Patent are hereby corrected as shown below:

Column 5, line 1, "WFT" should read -- WGT --.

Column 6, line 51, "b" should be in italics.

Column 6, line 61 "a" should be in italics.

Column 10, line 33, "dashdot" should read -- dash-dot --

Column 11, line 31 "pusle" should read -- pulse --

Column 12, line 25, "0.75mS x 256 X 193mS" should read
-- 0.75mS x 256 = 192mS --.

Column 15, line 32, after "conventional" insert -- local --
Column 16, line 40 "is" should read -- in --.

Signed and Sealed this

Sixteenth Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,150,258

DATED : April 17, 1979

INVENTOR(S) : Shigefumi Fujimoto, et al.

It is certified that error appears in the above-identified patent and that said Letters Patent are hereby corrected as shown below:

Col. 2, line 18, correct spelling of "cross".

Col. 4, line 26, change "cut off-control" to --cut-off control--.

Col. 4, line 55, change second "a" to --an--.

Col. 5, line 9, change "area" to --areas--.

Col. 5, line 26, after "multiplexed" delete --the--.

Col. 7, line 15, change "trunk" to --trunks--.

Col. 8, line 24, change "accordingly" to --Accordingly--.

Col. 8, line 52, change "response" to --responds--.

Col. 9, line 34, change "net work" to --network--.

Col. 9, line 57, change both occurrences of "uS" to --$\mu$S--.

Col. 10, line 44, correct spelling of "particularly".

Col. 11, line 32, change "If" to --It--.

Col. 11, line 40, change both occurrences of "uS" to --$\mu$S--.

Col. 11, line 46, change "uf" to --$\mu$F--.

Col. 11, line 61, change "(intraoffice)" to --(intra-office)--.

Col. 14, line 12, change "an other" to --another--.

UNITED STATES PATENT AND TRADEMARK OFFICE
CERTIFICATE OF CORRECTION

PATENT NO. : 4,150,258

DATED : April 17, 1979

INVENTOR(S) : Shigefumi Fujimoto, et al

It is certified that error appears in the above—identified patent and that said Letters Patent is hereby corrected as shown below:

Column 14, line 12, after "example" delete -- for --

Signed and Sealed this

Tenth Day of November 1981

[SEAL]

Attest:

GERALD J. MOSSINGHOFF

Attesting Officer

Commissioner of Patents and Trademarks